US010963981B2

(12) United States Patent
Li et al.

(10) Patent No.: US 10,963,981 B2
(45) Date of Patent: Mar. 30, 2021

(54) TRACKING IMAGE SENDERS ON CLIENT DEVICES

(71) Applicant: Citrix Systems, Inc., Fort Lauderdale, FL (US)

(72) Inventors: Shuzhen Li, Nanjing (CN); Sai Xu, Nanjing (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 101 days.

(21) Appl. No.: 16/371,596

(22) Filed: Apr. 1, 2019

(65) Prior Publication Data
US 2020/0296071 A1    Sep. 17, 2020

Related U.S. Application Data

(63) Continuation of application No. PCT/CN2019/077867, filed on Mar. 12, 2019.

(51) Int. Cl.
*G06T 1/00* (2006.01)
*H04L 12/26* (2006.01)
*H04N 1/32* (2006.01)

(52) U.S. Cl.
CPC .......... *G06T 1/0021* (2013.01); *G06T 1/005* (2013.01); *G06T 1/0028* (2013.01);
(Continued)

(58) Field of Classification Search
CPC ........ H04L 43/00; H04L 43/04; H04L 43/06; G06T 1/00; G06T 1/0021; G06T 1/0028;
(Continued)

(56) References Cited

U.S. PATENT DOCUMENTS 5,664,018 A * 9/1997 Leighton .............. G06F 21/10 283/113
5,949,885 A * 9/1999 Leighton .............. G06F 21/10 283/113
(Continued)

FOREIGN PATENT DOCUMENTS

CN    1381023 A    11/2002
CN    1453728 A    11/2003
(Continued)

OTHER PUBLICATIONS

Cox et al., "Secure Spread Spectrum Watermarking for Multimedia", IEEE (Year: 1997).*
(Continued)

*Primary Examiner* — Boris D Grijalva Lobos
(74) *Attorney, Agent, or Firm* — Banner & Witcoff, Ltd.

(57) ABSTRACT

Methods and systems for tracking image senders using client devices are described herein. A computing system may receive an image containing a first watermark vector corresponding to a user account of an image sender. The computing system may convert the image to a frequency domain image that contains the first watermark vector. From the frequency domain image, the computing system may identify the first watermark vector. The computing system may compare the first watermark vector to each of a plurality of stored watermark vectors, each corresponding to a known user account, to determine a probability of a match. The computing system may determine the user account of the sender of the image by determining which of the plurality of stored watermark vectors has a highest probability of a match, and may send, to a workplace administrator platform, an indication of the user account.

20 Claims, 15 Drawing Sheets

(52) U.S. Cl.
CPC ............ *G06T 1/0078* (2013.01); *H04L 43/04* (2013.01); *H04N 1/32149* (2013.01)

(58) Field of Classification Search
CPC ......... G06T 1/005; G06T 1/0078; H04N 1/00; H04N 1/32; H04N 1/32101; H04N 1/32128–32149
See application file for complete search history.

(56) References Cited

U.S. PATENT DOCUMENTS

| | | | | |
|---|---|---|---|---|
| 6,002,772 A * | 12/1999 | Saito | ............... | G06F 21/10 348/E7.056 |
| 6,359,998 B1 * | 3/2002 | Cooklev | ............... | A61F 2/44 382/100 |
| 6,510,233 B1 * | 1/2003 | Nakano | ............... | G06T 1/0021 375/E7.089 |
| 6,535,617 B1 * | 3/2003 | Hannigan | ............... | G06K 7/1417 382/100 |
| 6,782,116 B1 * | 8/2004 | Zhao | ............... | G06T 1/0028 382/100 |
| 6,901,514 B1 * | 5/2005 | Lu | ............... | G06T 1/005 380/252 |
| 7,293,294 B2 * | 11/2007 | Ukai | ............... | G06F 21/10 705/59 |
| 7,489,797 B2 * | 2/2009 | Izquierdo | ............... | G06T 1/0042 382/100 |
| 7,603,720 B2 * | 10/2009 | Rockwood | ............... | G06F 21/10 713/176 |
| 7,663,670 B1 * | 2/2010 | Orboubadian | ............... | H04N 9/045 348/231.2 |
| 7,802,306 B1 * | 9/2010 | Adams | ............... | G11B 20/00144 726/26 |
| 8,032,755 B2 * | 10/2011 | Beck | ............... | G06T 1/0021 713/176 |
| 8,886,944 B2 * | 11/2014 | Mastrangelo | ............... | H04N 1/32251 713/176 |
| 10,755,252 B1 * | 8/2020 | Li | ............... | G06Q 20/1235 |
| 2002/0016916 A1 * | 2/2002 | Natarajan | ............... | H04N 1/32144 713/179 |
| 2002/0164048 A1 * | 11/2002 | Bruckstein | ............... | G06T 1/005 382/100 |
| 2003/0103645 A1 * | 6/2003 | Levy | ............... | G11B 20/00884 382/100 |
| 2004/0091050 A1 * | 5/2004 | Choi | ............... | G06T 1/005 375/240.18 |
| 2004/0264732 A1 * | 12/2004 | Tian | ............... | H04N 1/3217 382/100 |
| 2005/0036652 A1 * | 2/2005 | Kesal | ............... | H04L 9/32 382/100 |
| 2005/0053258 A1 * | 3/2005 | Pasqua | ............... | G06F 21/16 382/100 |
| 2006/0109515 A1 * | 5/2006 | Zhao | ............... | H04L 9/3226 358/3.28 |
| 2007/0140523 A1 * | 6/2007 | Parisis | ............... | G06T 1/0028 382/100 |
| 2008/0180709 A1 * | 7/2008 | Tsuchitoi | ............... | H04N 1/32144 358/1.9 |
| 2008/0300900 A1 * | 12/2008 | Demarest | ............... | G06F 21/6272 705/1.1 |
| 2009/0136087 A1 * | 5/2009 | Oren | ............... | G06T 1/0021 382/100 |
| 2009/0300168 A1 * | 12/2009 | Guo | ............... | G06F 21/73 709/224 |
| 2010/0043081 A1 * | 2/2010 | Kiayias | ............... | H04L 9/083 726/30 |
| 2010/0074467 A1 * | 3/2010 | Lu | ............... | G06T 1/0021 382/100 |
| 2010/0177977 A1 * | 7/2010 | Seshadri | ............... | H04N 1/32288 382/248 |
| 2010/0183190 A1 * | 7/2010 | Ohzeki | ............... | G06T 1/005 382/100 |
| 2010/0186067 A1 * | 7/2010 | Stephenson | ............... | G06F 21/10 726/4 |
| 2011/0194737 A1 * | 8/2011 | Sharma | ............... | G06K 9/00577 382/112 |
| 2012/0011592 A1 * | 1/2012 | Loytynoja | ............... | H04N 1/32149 726/26 |
| 2012/0063635 A1 * | 3/2012 | Matsushita | ............... | G06T 1/0028 382/100 |
| 2014/0143545 A1 * | 5/2014 | McKeeman | ............... | H04L 63/0853 713/168 |
| 2015/0200773 A1 * | 7/2015 | Sella | ............... | H04N 1/32144 380/277 |
| 2016/0110666 A1 * | 4/2016 | Rahmouni | ............... | G06Q 10/0633 705/7.23 |
| 2016/0134619 A1 * | 5/2016 | Mikheev | ............... | H04L 67/10 726/8 |
| 2017/0300744 A1 * | 10/2017 | Ju | ............... | G06K 9/00288 |
| 2017/0329943 A1 * | 11/2017 | Choi | ............... | G06F 21/602 |
| 2019/0095595 A1 * | 3/2019 | Coleman | ............... | G06N 20/00 |
| 2020/0077483 A1 * | 3/2020 | Agarwal | ............... | G05B 15/02 |
| 2020/0084335 A1 * | 3/2020 | Guidotti | ............... | G06T 1/0028 |

FOREIGN PATENT DOCUMENTS

| | | |
|---|---|---|
| CN | 1517855 A | 8/2004 |
| CN | 101141466 A | 3/2008 |
| CN | 109087114 A | 12/2018 |

OTHER PUBLICATIONS

Marshall, "The Discrete Cosine Transform", Cardiff University (Year: 2001).*

Dec. 6, 2019—(WO) International Search Report and Written Opinion—App PCT/CN2019/077867.

* cited by examiner

TRACKING IMAGE SENDERS ON CLIENT DEVICES

CROSS-REFERENCE TO RELATED APPLICATIONS

The present application claims priority to International Application No. PCT/CN19/77867, filed Mar. 12, 2019, and entitled "Tracking Image Senders on Client Devices," which is hereby incorporated by reference as to its entirety.

FIELD

Aspects described herein generally relate to computer networks, data communications, and related software for enhanced processing systems for tracking image senders using client devices. In particular, one or more aspects of the disclosure relate to generating a watermark vector corresponding to an image sender, embedding the watermark vector in an image, and extracting the watermark vector once the image has been sent to identify the image sender.

BACKGROUND

Many organizations and individuals rely on electronic mail applications for internal and external communications. In some instances, these electronic mail applications may be configured to send images, which in some circumstances may contain confidential information. Thus, it may be important to identify senders of such confidential information in the event of a data leak to maintain enterprise security. In many instances, however, methods of tracking such senders may be difficult and may interrupt the user experience associated with such electronic mail applications. There remains an ever-present need to improve the tracking of image senders.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards effective, efficient, scalable, and convenient technical solutions that address and overcome the technical problems associated with identifying an image sender using embedded watermarks. For example, some aspects of the disclosure provide techniques that enable computing systems to increase security associated with confidential information without affecting a user experience at a client device.

In accordance with an embodiment of the disclosure, a computing system comprising at least one processor, a communication interface, and memory storing computer-readable instructions may receive an image containing a first watermark vector corresponding to a user account of a sender of the image. The computing system may convert the image to a frequency domain image that contains the first watermark vector. From the frequency domain image, the computing system may identify the first watermark vector. The computing system may compare the first watermark vector to each of a plurality of stored watermark vectors, each corresponding to a known user account, to determine a probability that each of the plurality of stored watermark vectors matches the first watermark vector. The computing system may determine the user account of the sender of the image by determining which of the plurality of stored watermark vectors has a highest probability of a match with the first watermark vector, and may send, to a workplace administrator platform, an indication of the user account of the sender of the image.

In one or more embodiments, the computing system may receive the image at a dispatch service module of the computing system, which may be configured to route the image to a plurality of worker service modules of the computing system. In these embodiments, each of the worker service modules may correspond to a different known user account.

In one or more embodiments, the computing system may apply, at each of the worker service modules and to each of the respective known user accounts, a hash function to convert each of the known user accounts to a binary string. At each of the worker service modules and to each binary string, the computing system may apply a matrix composition algorithm to generate a binary matrix for each of the known user accounts. At each of the worker service modules and from each binary matrix, the computing system may extract a watermark vector. At each of the worker service modules, the computing system may store the extracted watermark vectors, resulting in the plurality of stored watermark vectors.

In one or more embodiments, the computing system may extract the watermark vectors by applying, at each of the worker service modules and to each binary matrix, an singular value decomposition (SVD) algorithm to determine the extracted watermark vectors. In one or more instances, in receiving the image containing the first watermark vector, the computing system may receive an indication of the user account of the sender of the image. In determining the user account of the sender of the image, the computing system may track a source of a data leak associated with the image containing the first watermark vector.

In one or more embodiments, the computing system may receive from the workplace administrator platform, an enterprise user list input corresponding to a list of the known user accounts. In these embodiments, the computing system may generate, for each of the known user accounts, a worker service module.

In one or more embodiments, the computing system may identify the first watermark vector by extracting, from a predetermined sub-region of the frequency domain image, the first watermark vector. In one or more embodiments, the image may contain the first watermark vector in more than one location and the computing system may identify the first watermark vector in at least one of the locations.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
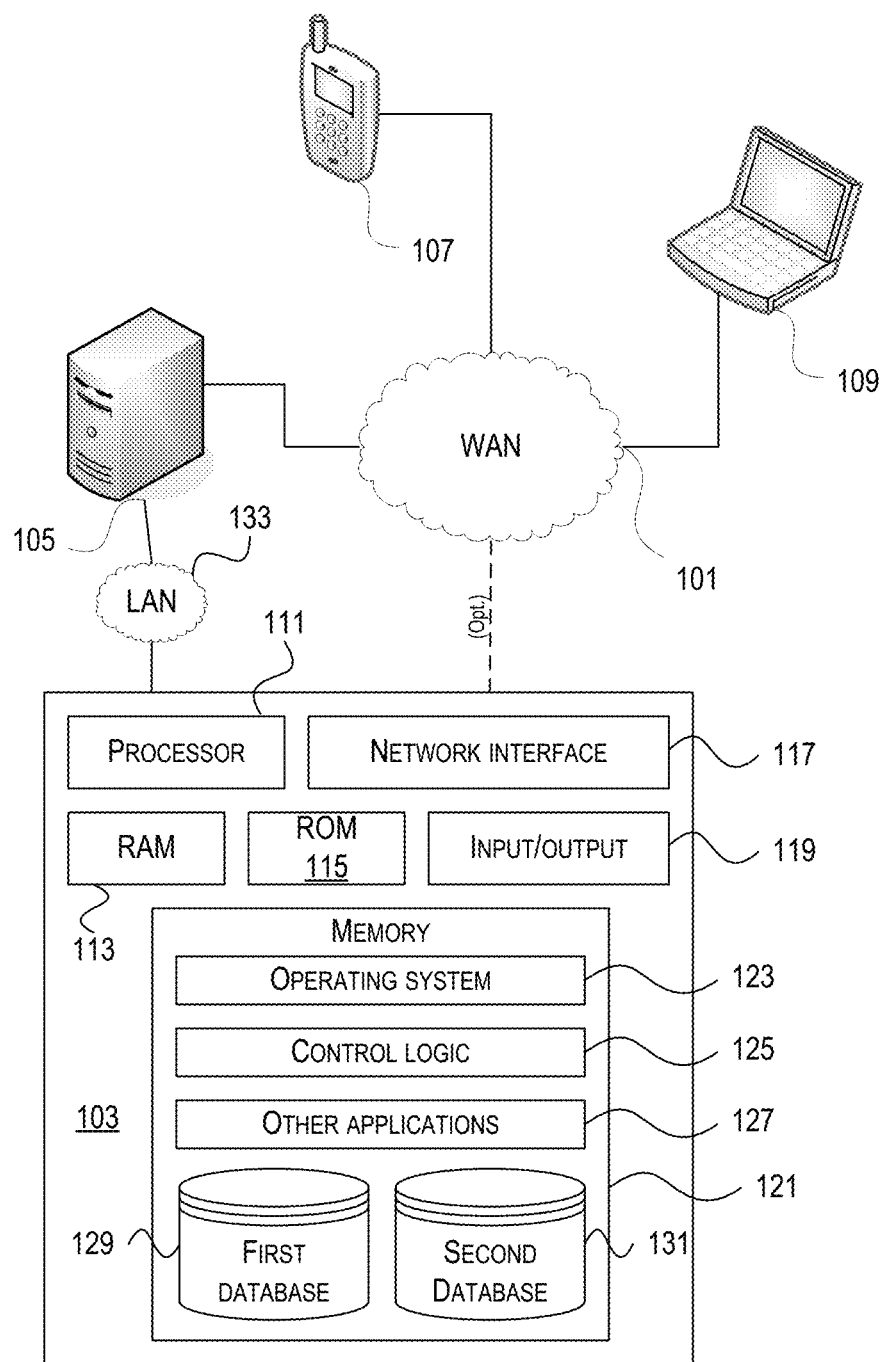
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a method algorithm for tracking image senders that embeds a watermark into an image's frequency domain. In doing so, sender information may be embedded on a mobile device covertly and may be identified by a filter server automatically. Accordingly, the method algorithm may be robust to geometric transformation attacks, and may be used in a corporation to trace data leakage and enforce copyright protection.

When compared with traditional discrete cosine transform (DCT) watermarking, this method algorithm enables tracking of sender information without access to an original image. In one or more instances, this method algorithm may be performed at an account filter server, allowing only a corporate administrator with an account list to identify hidden encrypted information. In these instances, the account filter server may use a worker service module to calculate a probability of a marked image containing various account information, and outputs the most probable account. This may increase accuracy of sender identification and may make the method algorithm described herein robust to geometric attacks.

The wide use of mobile devices brings a major security challenge in networked office environments. For example, a person who possesses a piece of data may distribute it, copy it, or alter it. Data owners may lose control over their data when it reaches the Internet. Furthermore, people may obtain sensitive information by taking a photo or device screenshot and may easily distribute the sensitive information using a mail application. When a data leak causes a loss of intellectual property, there is a need to trace back to a specific unit, piece of equipment, or individual.

To protect corporate security, an endpoint management policy may be provided in a mail application that may disable a device camera. However, this may affect a user experience with the mail application. The method algorithm described herein provides a way to embed account information into an image before sending the image using the mail application. This embedding/tracking process may be visible only to a corporate administrator.

To mitigate data leakage threat and protect copyrights, many digital watermark methods have been proposed. One method algorithm is in the spatial domain and another is in the frequency domain. Spatial domain watermark algorithms such as least significant bit (LSB) support a large amount of watermark information but the anti-interference ability is relatively poor. Frequency domain algorithms are also divided into two types. One type is robust to attacks but requires an original image for watermark extraction. Another type uses the stable features in an image to extract a watermark, which reduces data carrying capacity.

Considering that the account list is determined and countable in an application scenario of enterprise security, the method algorithm described herein may use a frequency domain algorithm for embedding and an account filter server for tracking. On a client device, a mobile application management (MAM) application may send just a marked image. On an account filter server, an SVD feature vector of account information may be used to help check the possibility of a marked image containing an account corresponding to the image sender. Accordingly, this method algorithm is feasible for sender tracking on client devices in a user-transparent, safe, and accurate manner.

As a brief introduction to the methods described further below, a client device may use a hash algorithm to protect user information from being obtained by outsiders. In this method, the client device may use an MD5 message-digest algorithm to process a variable-length account string into a fixed-length output of 128 bit. Mail accounts in a corporate environment may be relatively similar. However, by using the MD5 hash, the client device may turn tiny differences between two accounts into two completely different hash, which may improve data security and the accuracy of the sender account tracing.

The 128-bit MD5 hash may be represented as an 8*16 matrix, and the client device may extract a feature vector from the matrix using an SVD algorithm. In one or more instances, the feature vector may have a length of 256 bits, and may be embedded into an image to check the possibility that the image contains a suspicious account.

The client device may divide an original gray level image into non-overlapped blocks (e.g., 32×32 pixels). The client device may transform these blocks from the space domain into the frequency domain by applying a DCT algorithm, and may embed the feature vector into one or more blocks. The client device may then apply a reverse DCT algorithm to recover the marked image, which may cause the feature vector to scatter into various areas of the image with security and invisibility.

For each candidate account in an account list, an account filter server may similarly encrypt the account information and generate a feature vector of the account information. The account filter server may perform a DCT transformation on the marked image, and may compare a selected block of the marked image to determine a probability that the feature vector of the account information matches the feature vector of the marked image.

An administrator computing platform may input the marked image and one or more enterprise user lists into the account filter server. The account filter server may use one or more worker service modules to traverse the user list to calculate a probability of a match and to output the most possible account.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
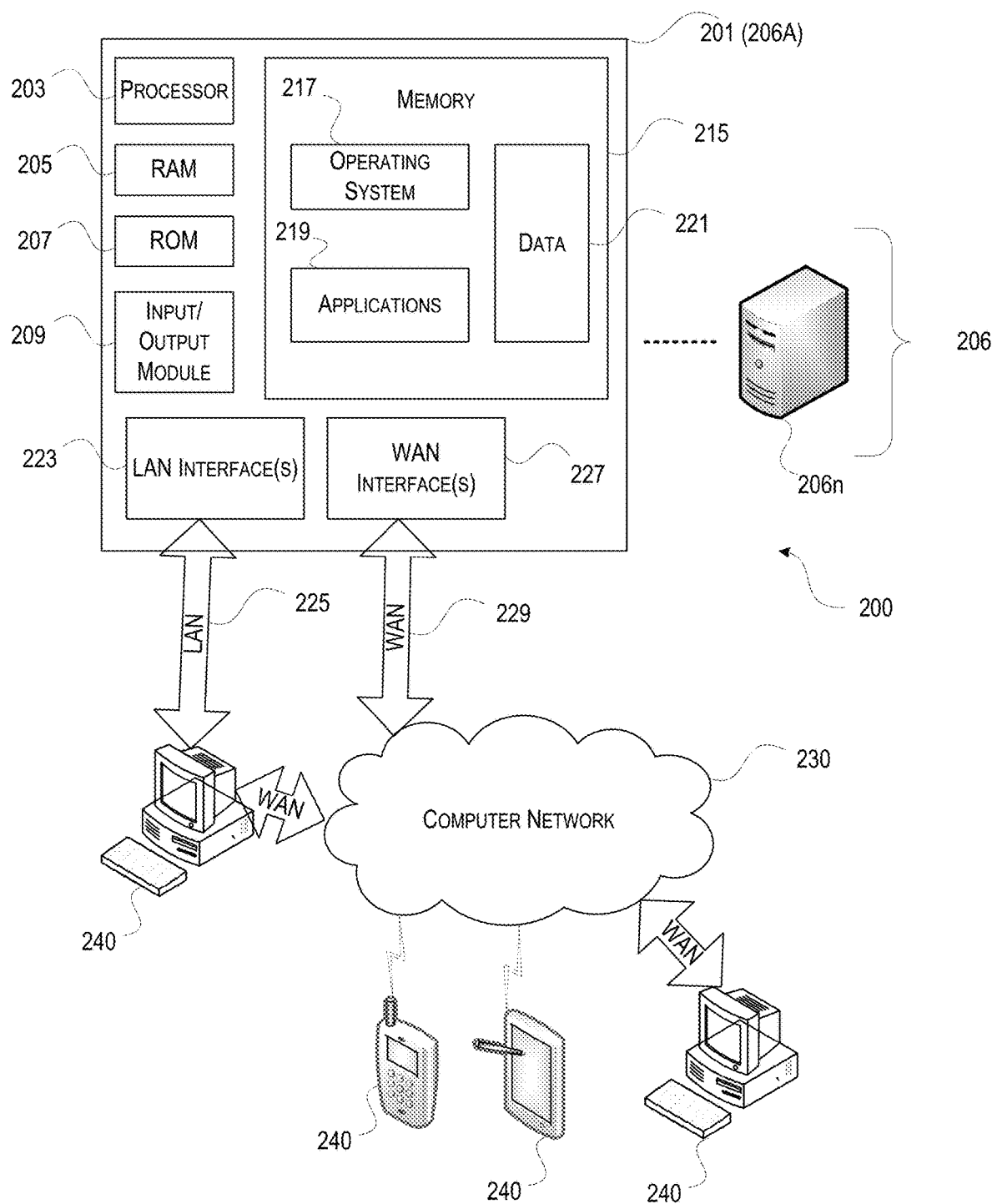
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
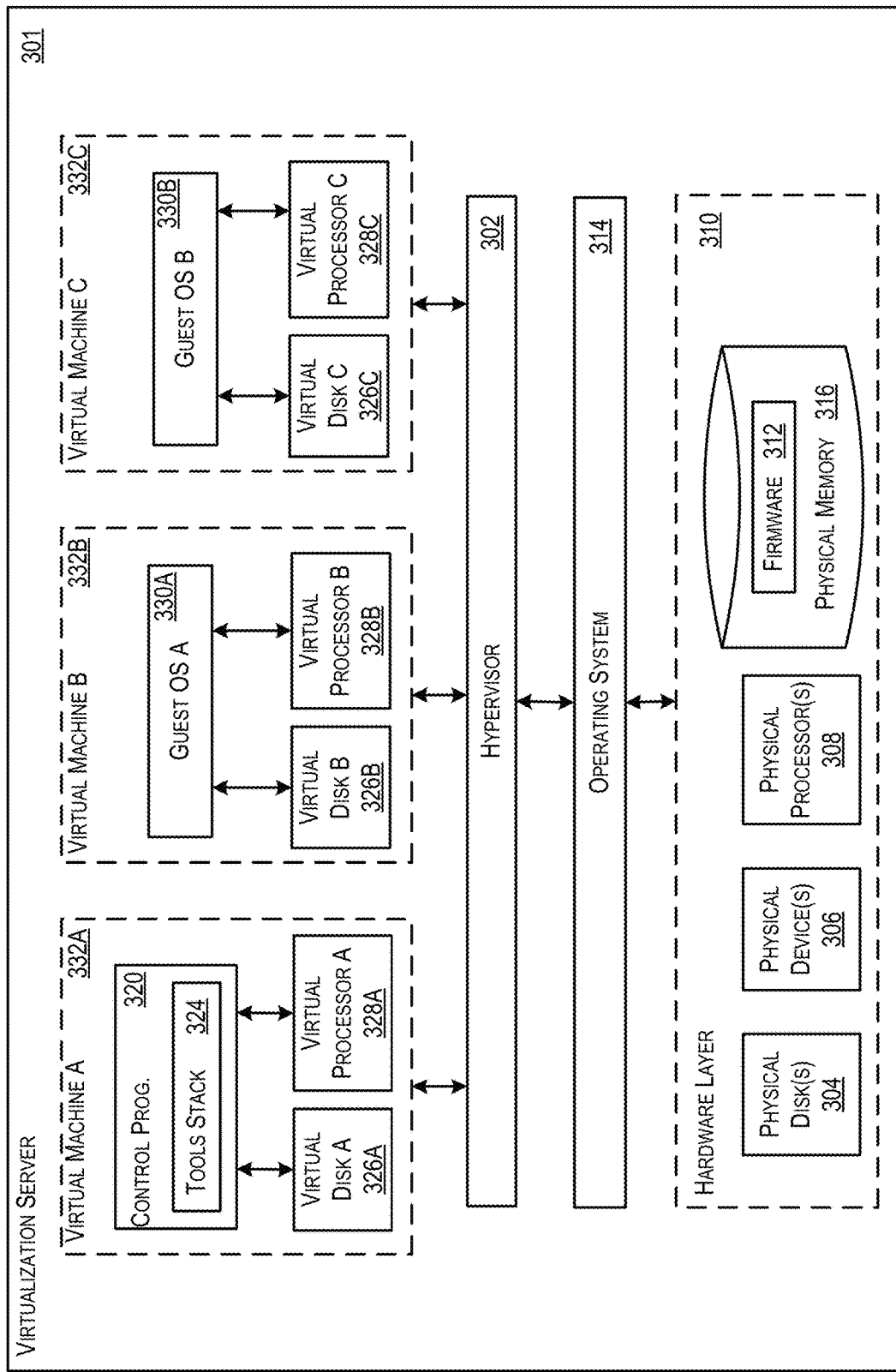
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
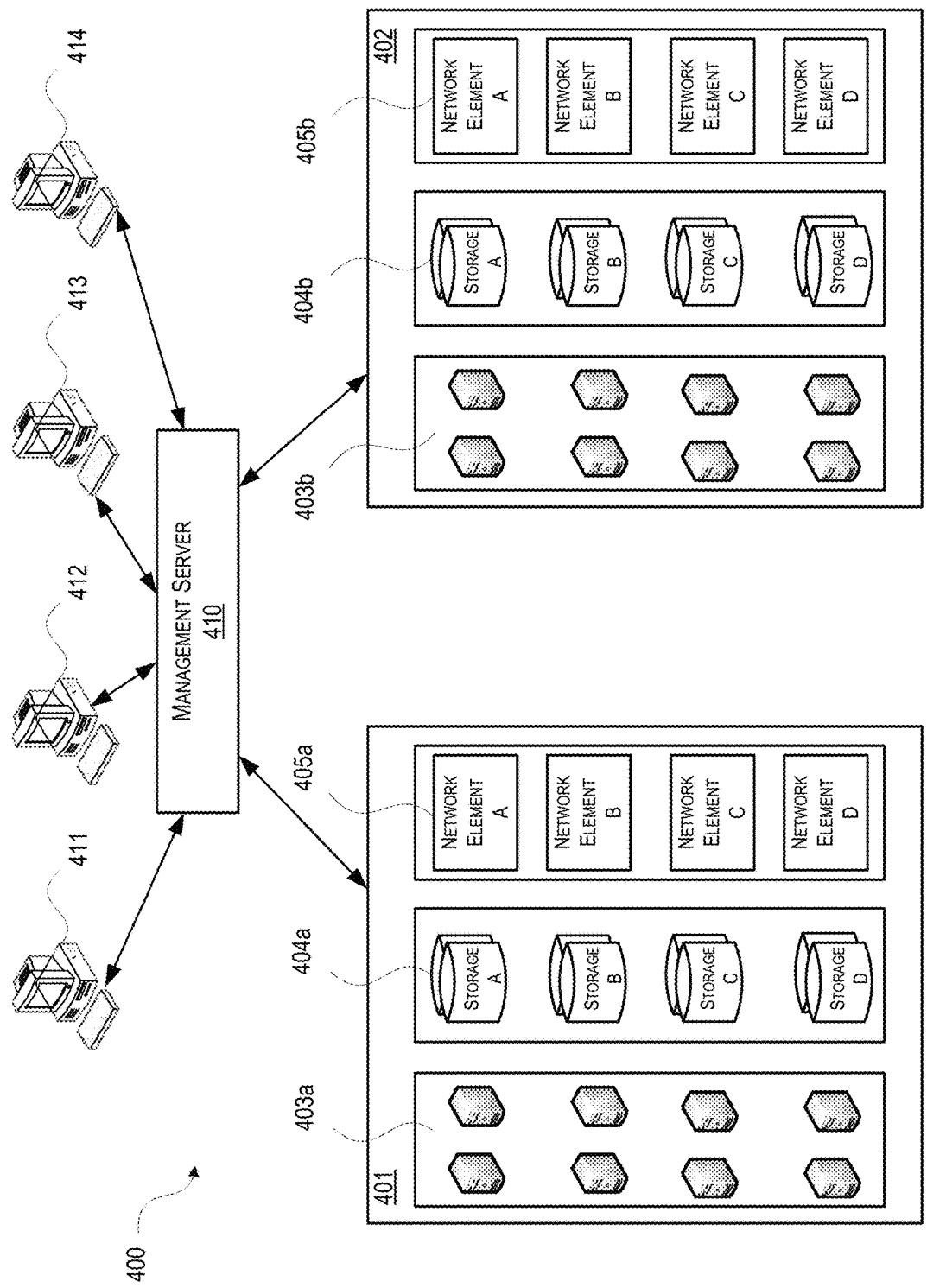
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
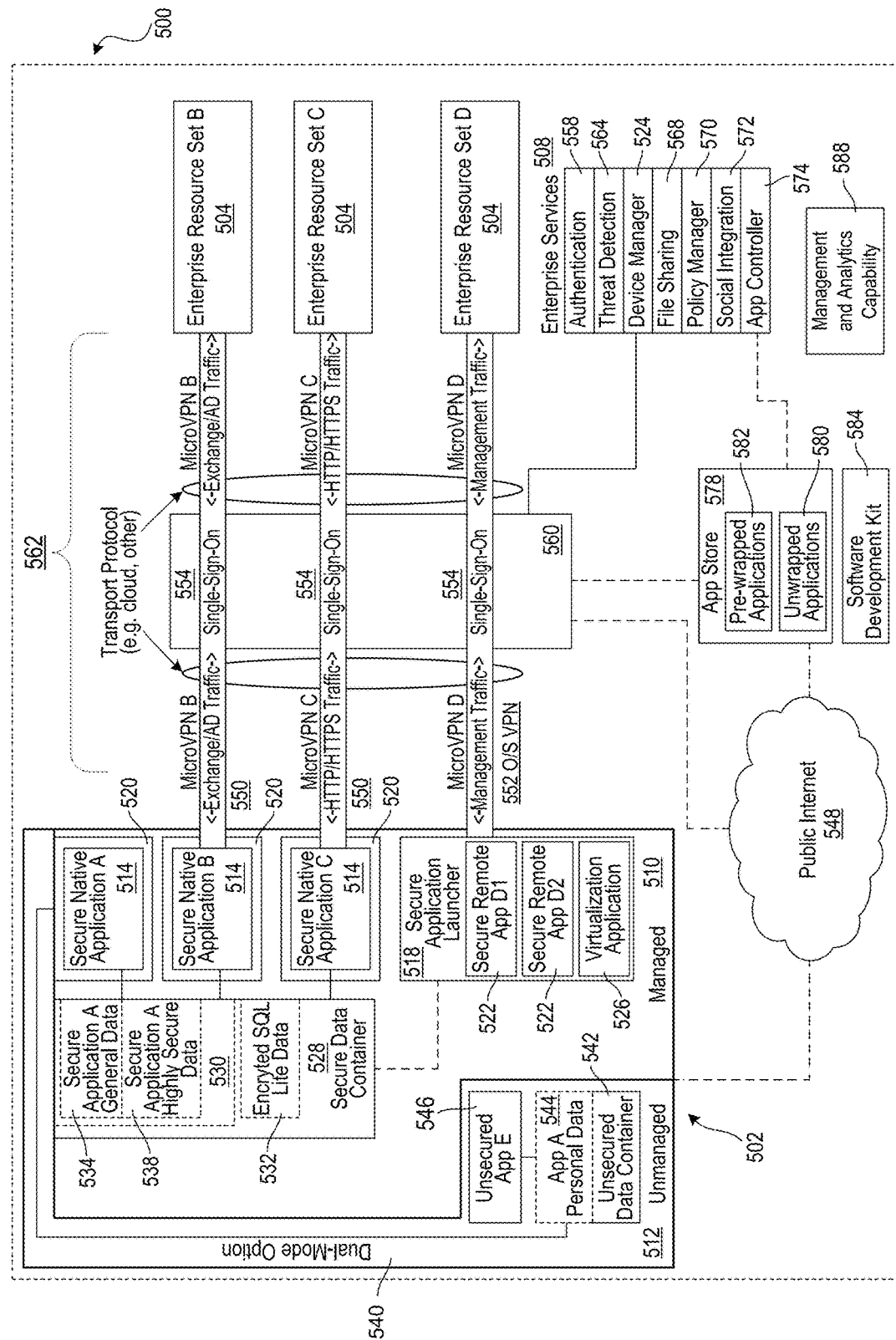
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
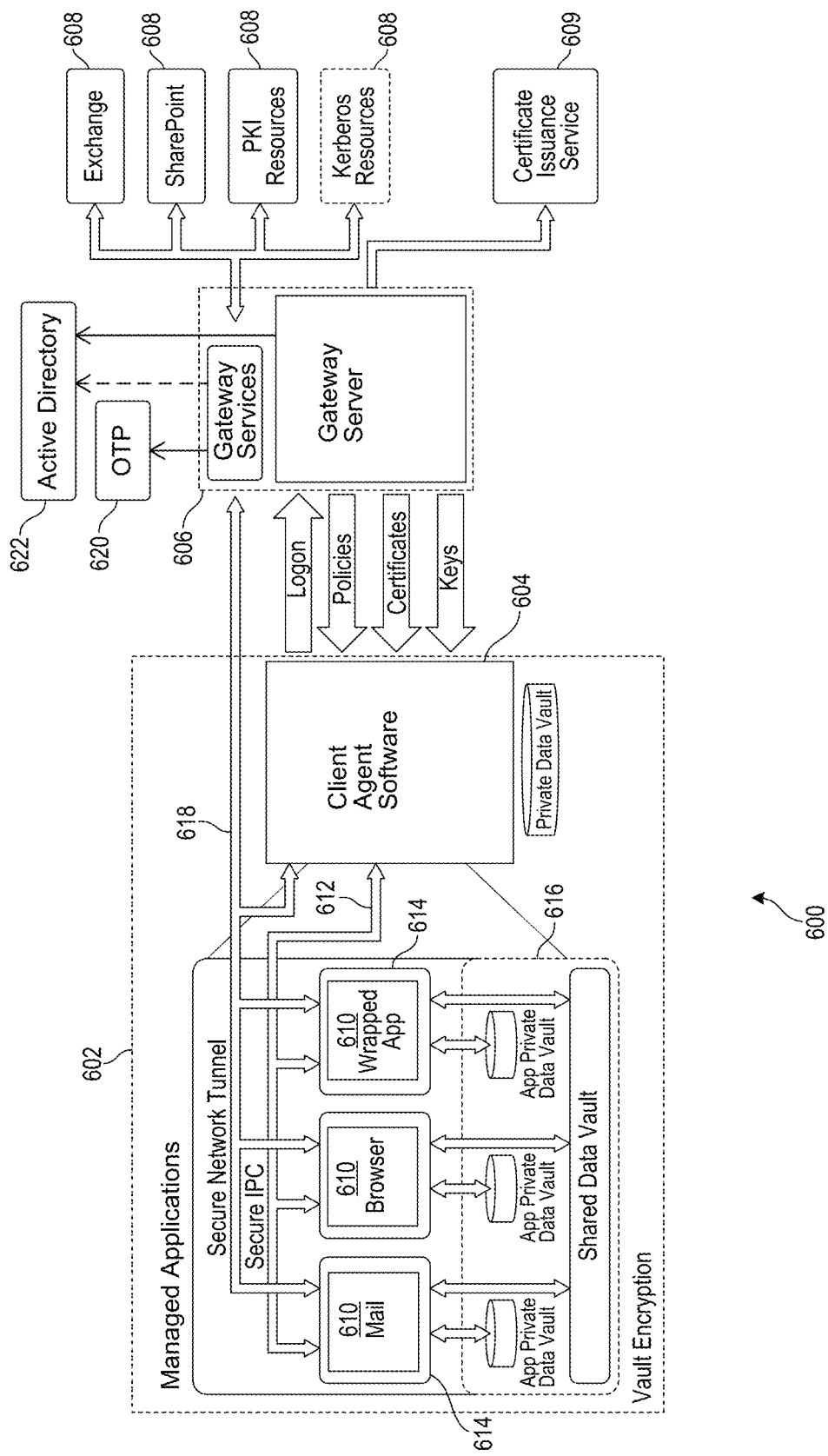
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Tracking Image Senders on Client Devices

Figure 7A:
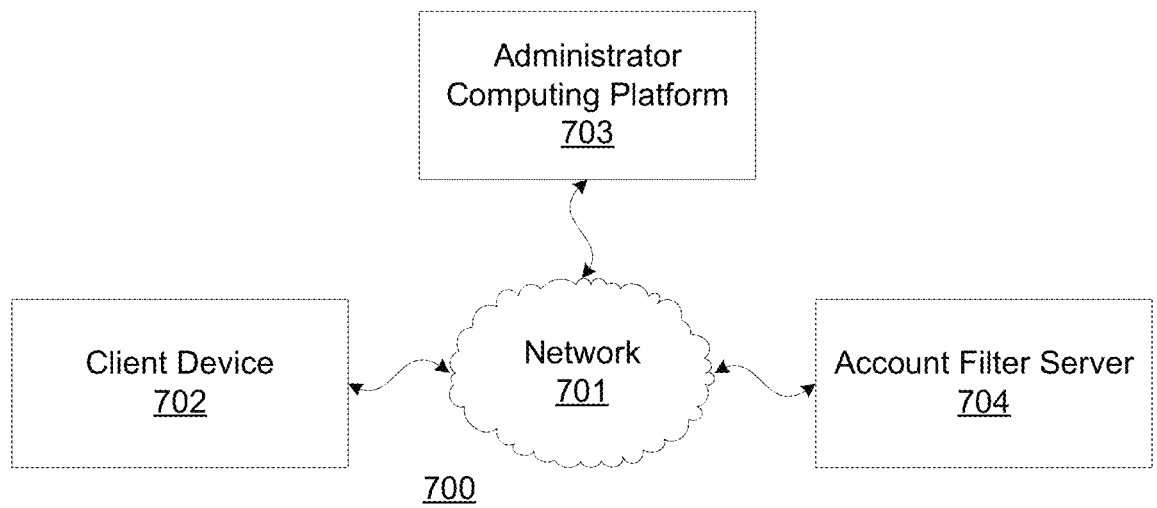
FIGS. 7A-7C depict an illustrative computing environment for deploying an enhanced processing system that performs tracking of image senders in accordance with one or more example embodiments.
Figure 7B:
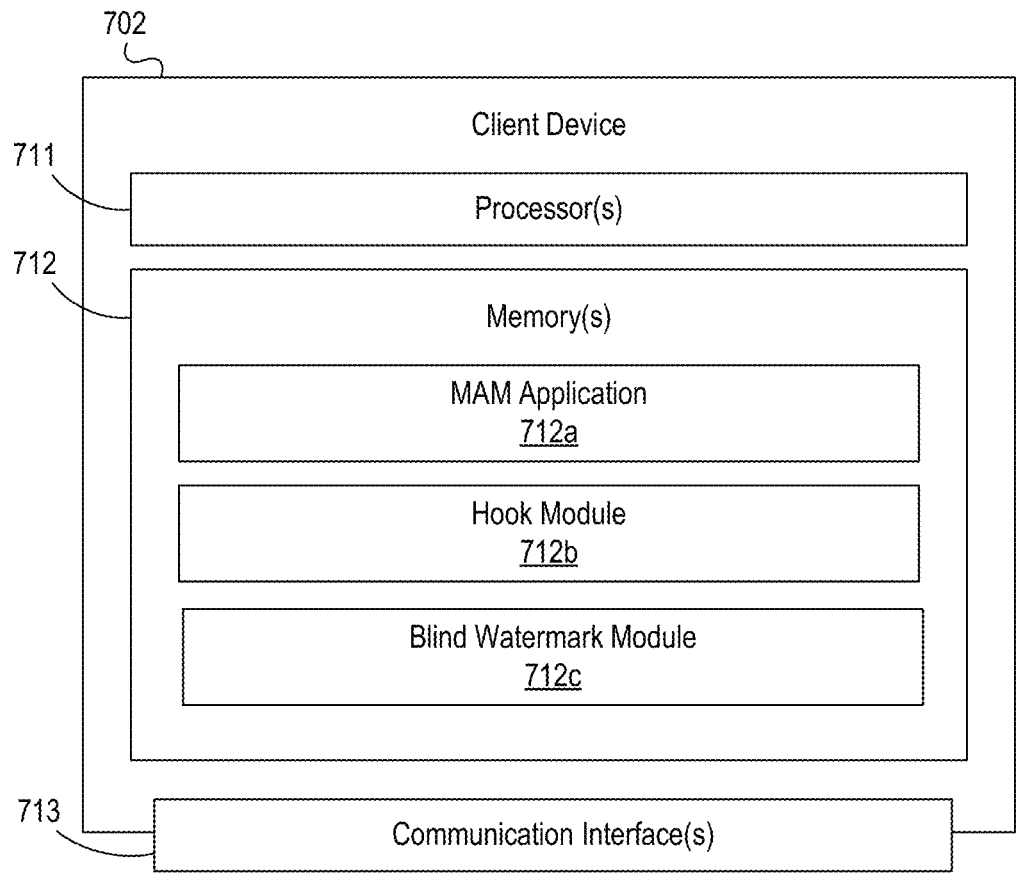

FIGS. 7A and 7B depict an illustrative computing environment for tracking an image sender using a client device in accordance with one or more example embodiments. Referring to FIG. 7A, computing environment 700 may include one or more computer systems. For example, computing environment 700 may include a client device 702, an administrator computing platform 703, and an account filter server 704.

As illustrated in greater detail below, client device 702 may include one or more computing devices configured to perform one or more of the functions described herein. For example, client device 702 may be a mobile device, a tablet, a smart phone, laptop computer, desktop computer, or the like. In some instances, the client device 702 may be configured to capture images, embed a unique watermark vector into the images, and route the images to additional computing platforms that may be configured to determine a sender of the images based on the unique watermark vector.

Administrator computing platform 703 may be a computer system that includes one or more computing devices and/or other computer components (e.g., laptop computers, desktop computers, processors, memories, communication interfaces, servers, server blades, or the like). In addition, administrator computing platform 703 may be configured to receive images from client device 702 that contain the watermark vectors described above. The administrator computing platform 703 may also be configured to send the images to an account filter server for identification of a sender corresponding to the images and to receive an indication of an account corresponding to the sender.

As illustrated in greater detail below, account filter server 704 may be a computer system that includes one or more computing devices and/or other computer components (e.g., processors, memories, communication interfaces, servers, server blades, or the like). In addition, account filter server 704 may be configured to receive images from the administrator computing platform 703, determine an account corresponding to a sender of the images, and provide the administrator computing platform 703 with an indication of the sender.

Computing environment 700 may also include one or more networks, which may interconnect client device 702, administrator computing platform 703, and account filter server 704. For example, computing environment 700 may include a network 701 (which may e.g., interconnect client device 702, administrator computing platform 703, and account filter server 704).

In one or more arrangements, client device 702, administrator computing platform 703, account filter server 704, and/or the other systems included in computing environment 700 may be any type of computing device capable of receiving a user interface, receiving input via the user interface, and communicating the received input to one or more other computing devices. For example, client device 702, administrator computing platform 703, account filter server 704, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 702, administrator computing platform 703, and account filter server 704 may, in some instances, be special purpose computing devices configured to perform specific functions.

Referring to FIG. 7B, client device 702 may include one or more processors 711, memory 712, and communication interface 713. A data bus may interconnect processor 711, memory 712, and communication interface 713. Communication interface 713 may be a network interface configured to support communication between the client device 702 and one or more networks (e.g., network 701, or the like). Memory 712 may include one or more program modules having instructions that when executed by processor 711 cause client device 702 to perform one or more functions described herein and/or access one or more databases that may store and/or otherwise maintain information which may be used by such program modules and/or processor 711. In some instances, the one or more program modules and/or databases may be stored by and/or maintained in different memory units of client device 702. For example, memory 712 may have, host, store, and/or include a MAM application 712a, a hook module 712b, and a blind watermark module 712c. MAM application 712a may cause the client device 702 to retrieve images from a stored album or camera application. Hook module 712b may be configured to intercept images between storage and the MAM application 712a. Blind watermark module 712c may be configured to encode user enterprise accounts, extract a corresponding feature vector, and embed the feature vector into a frequency domain of the images, as discussed in greater detail below.

Figure 7C:
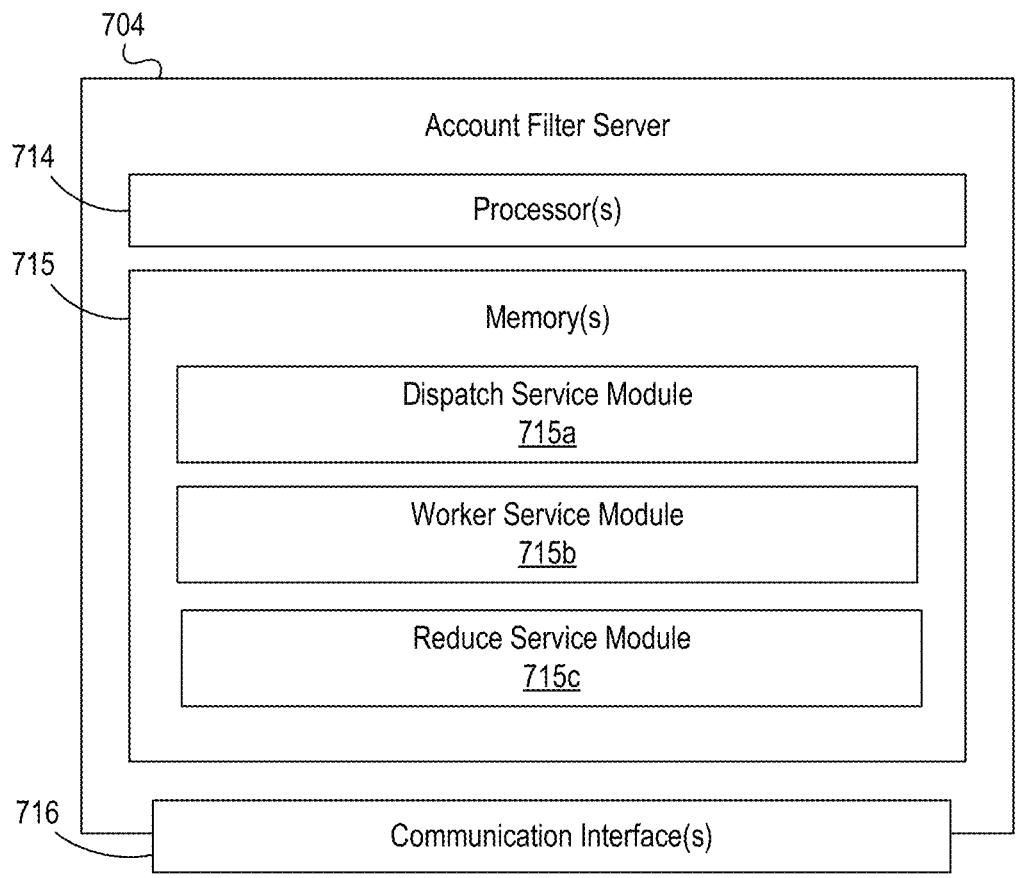

Referring to FIG. 7C, account filter server 704 may include one or more processors 714, memory 715, and communication interface 716. A data bus may interconnect processor 714, memory 715, and communication interface 716. Communication interface 716 may be a network interface configured to support communication between the account filter server 704 and one or more networks (e.g., network 701, or the like). Memory 715 may include one or more program modules having instructions that when executed by processor 714 cause account filter server 704 to perform one or more functions described herein and/or access one or more databases that may store and/or otherwise maintain information which may be used by such program modules and/or processor 714. In some instances, the one or more program modules and/or databases may be stored by and/or maintained in different memory units of account filter server 704. For example, memory 715 may have, host, store, and/or include a dispatch service module 715a, a worker service module 715b, and a reduce service module 715c. Dispatch service module 715a may be configured to dispatch received images to various worker service modules for analysis. The worker service modules 715b may be configured to compare received images and various user accounts to determine a probability that each user account corresponds to a sender of the images. The reduce service module 715c may be configured to determine and output a user account with the greatest probability of corresponding to a sender of the images.

Figure 8A:
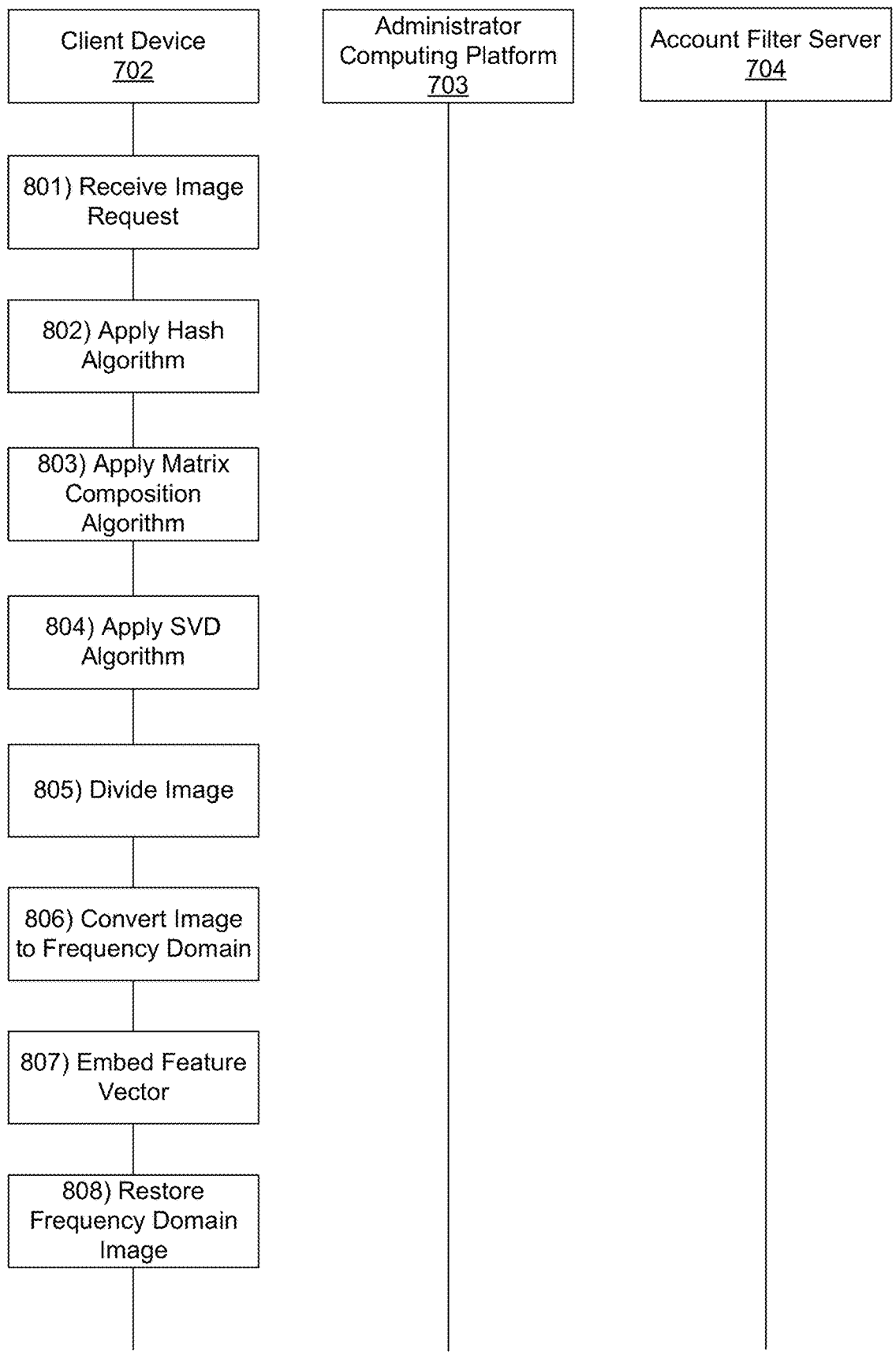
FIGS. 8A-8C depict an illustrative event sequence algorithm for deploying an enhanced processing system that performs tracking of image senders in accordance with one or more example embodiments.
Figure 8B:
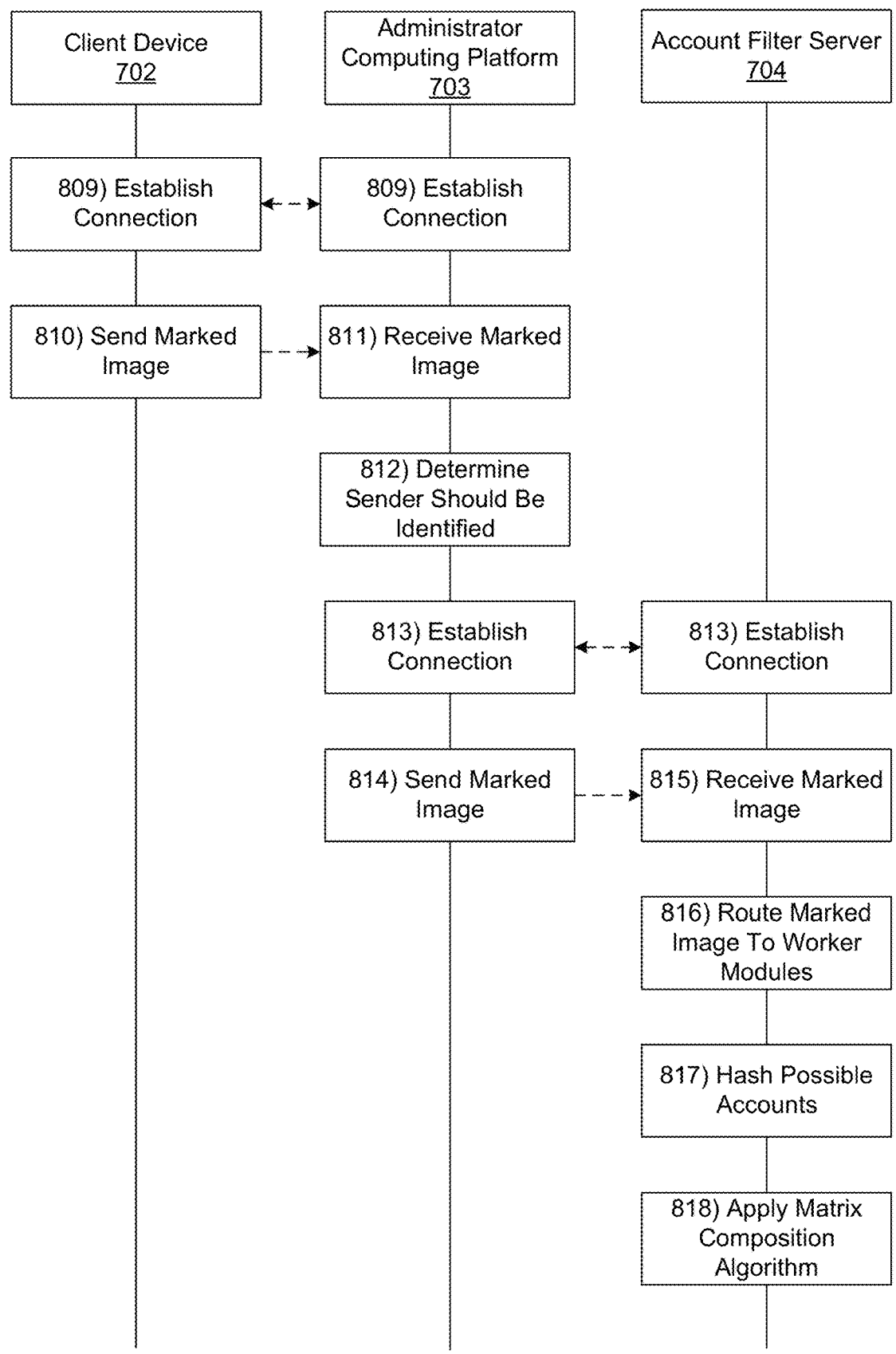
Figure 8C:
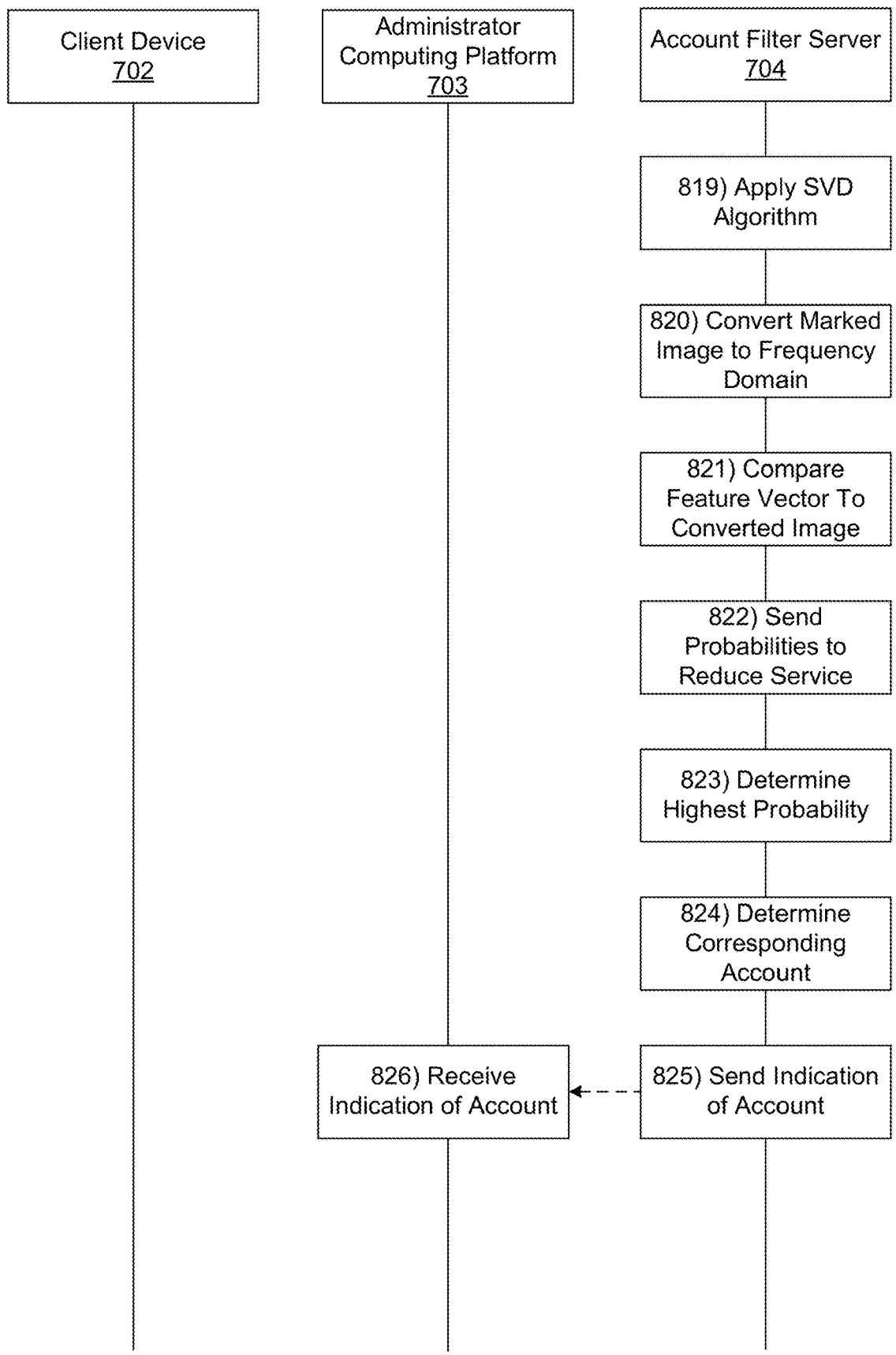

FIGS. 8A-8C depicts an illustrative event sequence algorithm for deploying an enhanced processing system that performs tracking and identification of image senders in accordance with one or more example embodiments. It should been understood that steps 801-826 may occur in the order as shown with regard to FIGS. 8A-8C. For example, after completing step 808 of FIG. 8A, the event sequence algorithm may proceed to step 809 of FIG. 8B. Referring to FIG. 8, at step 801, the client device 702 may receive a request to send an image to another computing device. In some instances, the other computing device may be located on a shared internal network along with the client device 702. In other instances, the other computing device may be located on an external network. In some instances, in receiving the request to send the image, the client device 702 may receive a request to send confidential information, internal data, or the like. In one or more instances, the client device 702 may receive the request to send the image by receiving a user input via a display of the client device 702 or another input mechanism corresponding to the client device 702 (keyboard input, mouse input, or the like).

As an example, a user may access a secure electronic messaging application on the client device 702. In one or more instances, the secure electronic messaging application may be running at a remote desktop, virtual machine, or the like. The client device 702 may receive an input from the user requesting the client device 702 to access and send, via the electronic messaging application, an image containing confidential information. In these instances, the MAM application 712a may request access to the image through a stored album or camera application.

At step 802, after receiving the request to send the image at step 801, the client device 702 may retrieve user account information, corresponding to a user (e.g., an email, a user name, a cell phone number, and a serial number, or the like), and may apply a hash algorithm to the user account information. In these instances, client device 702 may retrieve the requested image and the hook module 712b may intercept the image prior to its delivery to the MAM application 712a. Once intercepted, the requested image may be sent from the hook module 712b to the blind watermark module 712c, which may perform steps 802-808. In one or more instances, by applying the hash function, the client device 702 may encrypt the user account information. In these instances, the client device 702 may apply a MD5 hash algorithm to the user account information, which may result in a 128 bit binary vector corresponding to the user account information.

At step 803, the client device 702 may apply a matrix composition algorithm to the 128 bit binary vector generated at step 802. In these instances, the client device 702 may generate a matrix based on the 128 bit binary vector. For example, the client device 702 may generate an 8×18 matrix corresponding to the 128 bit binary vector.

At step 804, the client device 702 may apply a SVD algorithm to the matrix generated at step 803. In applying the SVD algorithm, the client device 702 may extract a feature abstract (e.g., a watermark vector) from the matrix that is representative of the user account information. In one or more instances, in applying the SVD algorithm, the client device 702 may extract a single row of the binary vector generated at step 803.

At step 805, the client device 702 may retrieve the image requested at step 801. In one or more instances, the client device 702 may retrieve the image from a photo memory, a camera application, or the like. In these instances, the client device 702 may retrieve an image containing confidential information. In one or more instances, once the image is retrieved, the client device 702 may divide the image into a plurality of 32 by 32 pixel blocks. For example, the client device 702 may divide the image into 64 blocks, each of which may have dimensions of 32 by 32 pixels.

At step 806, the client device 702 may convert the image to the frequency domain. In one or more instances, the client device 702 may convert the image to the frequency domain by applying a DCT algorithm to the image. At step 807, once the image has been converted to the frequency domain, the client device 702 may embed the watermark vector, generated at step 804, into one or more blocks of the image. In one or more instances, by embedding the watermark vector into the image, the client device 702 may embed an identifier of the user account that requested the image to be sent at step 801.

At step 808, once the client device 702 embeds the feature vector into the frequency domain image, the client device 702 may convert the frequency domain image back to the spatial domain. In one or more instances, the client device 702 may convert the frequency domain image back to the spatial domain using an inverse discrete cosine transform (IDCT) algorithm. As a result, the client device 702 may embed an indication of the user account information into the image prior to sending, resulting in a marked image. After completing step 808, the client device may proceed to step 809, which is shown in FIG. 8B.

Figure 11:
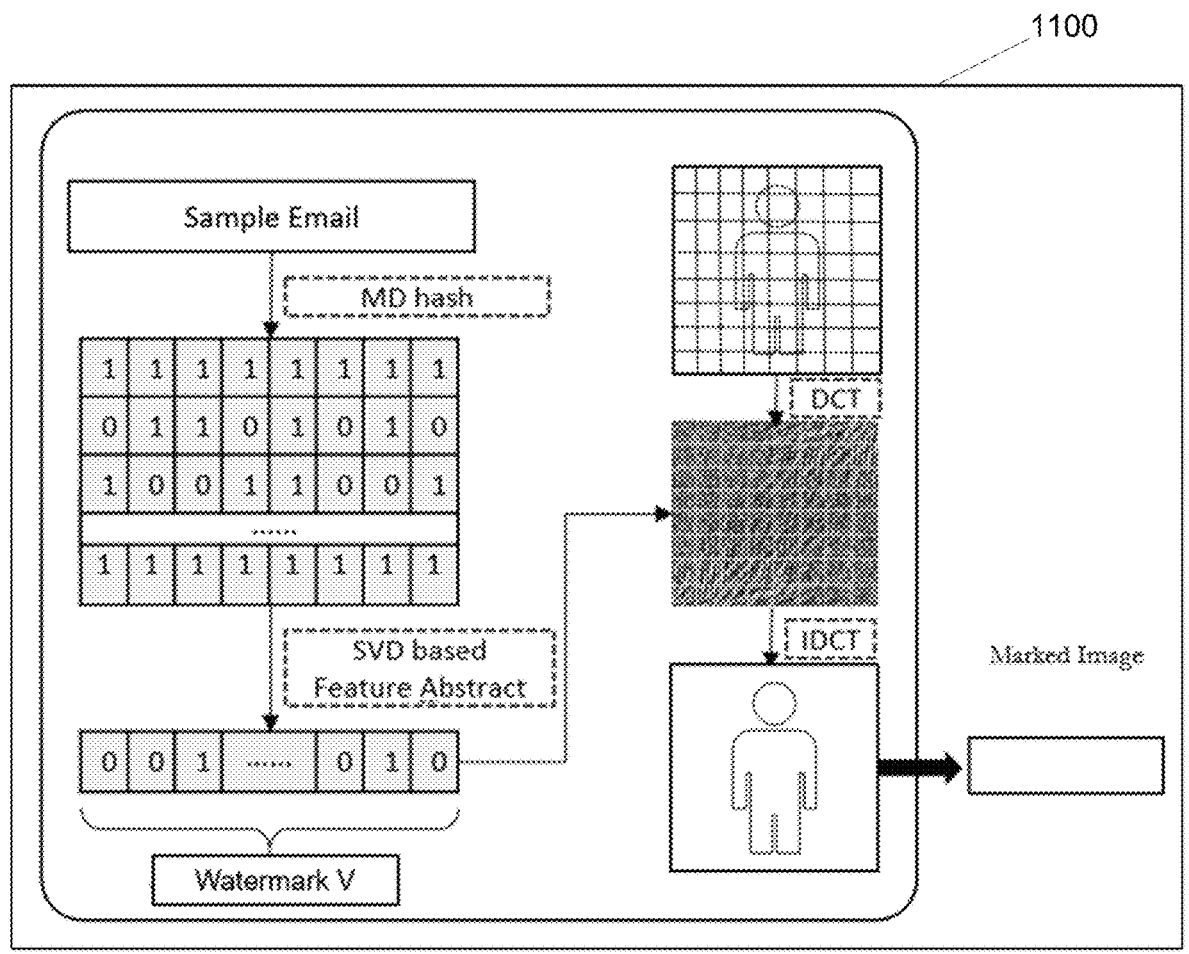
FIGS. 11 and 12 depict illustrative process flow charts for deploying an enhanced processing system that performs tracking of image senders in accordance with one or more example embodiments.

Actions performed at steps 801-808 are further illustrated in process flow chart 1100, which is shown in FIG. 11. For example, as shown in FIG. 11, the client device 702 may apply a hash algorithm to encrypt user account characters (e.g., an email address), and may generate a corresponding matrix of encrypted user account characters. Then, the client device 702 may abstract an SVD feature from the encrypted information (e.g., a feature vector/watermark vector). After determining the watermark vector, the client device 702 may transform the image from the space domain to the frequency domain, and may embed the watermark vector into a selected block of the image. In some instances, the client device 702 may embed the watermark vector diagonally or along an edge of the image. After embedding the watermark vector, the client device 702 may restore the images from the frequency domain to the spatial domain, resulting in a marked image.

Referring to FIG. 8B at step 809, the client device 702 may establish a connection with the administrator computing platform 703. In one or more instances, the client device 702 may establish a first wireless data connection with the administrator computing platform 703 to link the client device 702 to the administrator computing platform 703.

At step 810, the client device 702 may send the marked image, generated at step 808, to the administrator computing platform 703 to the administrator computing platform 703. In one or more instances, the client device 702 may send the marked image via the communication interface 713 while the first wireless data connection is established. In one or more instances, the blind watermark module 712c may return the marked image to the hook module 712b, which may allow the marked image to pass to the MAM application 712a as originally requested. In these instances, the marked image may be sent to the administrator computing platform 703 from the MAM application 712a.

At step 811, administrator computing platform 703 may receive the marked image sent at step 810. In one or more instances, the administrator computing platform may receive the marked image via the communication interface 716 and while the first wireless data connection is established. At step 812, the administrator computing platform 703 may determine whether the sender of the marked image should be identified. In one or more instances, the administrator computing platform 703 may determine that the sender of the marked image should be identified if the marked image contains confidential information. In other instances, the administrator computing platform 703 may determine that the sender of all images should be identified, regardless of the contents of the image. Additionally or alternatively, the administrator computing platform 703 may determine that the sender of the marked image should be determined if the marked image is being sent to a device on an external network, but not if the marked image is being sent internally. If the administrator computing platform 703 determines that the sender of the marked image should not be identified, the event sequence algorithm may end. If the administrator computing platform 703 determines that the sender of the marked image should be identified, the administrator computing platform 703 may proceed to step 813.

At step 813, the administrator computing platform 703 may established a connection with the account filter server 704. In one or more instances, the administrator computing platform 703 may establish a second wireless data connection with the account filter server 704 to link the administrator computing platform 703 to the account filter server 704.

At step 814, the administrator computing platform 703 may send the marked image to the account filter server 704. In one or more instances, the administrator computing platform 703 may send the marked image to the account filter server 704 via the communication interface 716 and while the second wireless data connection is established.

At step 815, the account filter server 704 may receive the marked image sent at step 814. In one or more instances, the account filter server 704 may receive the marked image while the second wireless data connection is established. In one or more instances, the account filter server 704 may receive the marked image at the dispatch service module 715a.

At step 816, the account filter server 704 may generate one or more copies of the marked image at a dispatch service module of the account filter server (e.g., dispatch service module 715a), and may route a marked image to each of a plurality of worker service modules (e.g., worker service module 715b). In these examples, the account filter server 704 may contain a worker service module 715b corresponding to each of a plurality of users (e.g., employees at a company, members of an internal network, a subset of employees, or any other predefined group of users). In these examples, each of the worker service modules 715b may have user account information (e.g., an email address, a phone number, a hardware serial number, a user name, or the like) associated with their corresponding user.

As an example, if there are three employees at a company, the account filter server 704 may maintain a worker service module 715b for each of the three employees. Accordingly, a first worker service module may include an email address for employee one, a second worker service module may include an email address for employee two, and a third worker service module may include an email address for employee three.

In one or more instances, the account filter server 704 may receive an enterprise user list input corresponding to a list of known user accounts. For example, if a company includes the employees one, two, and three, the administrator computing platform 703 may send the enterprise user list to the account filter server 704, and the list may include user account information corresponding to employees one, two, and three. In these instances, the account filter server 704 may generate, for each known user account, a worker service module 715b. In one or more instances, the account filter server 704 may receive the enterprise user least along with the marked image (e.g., at step 815). In one or more instances, the account filter server 704 may generate worker service modules 715b for various groups of employees (e.g., a first worker service module for an engineering team and a second worker service module for a corporate team). In these instances, the worker service modules 715*b* may contain sub-modules corresponding to each employee.

At step 817, the account filter server 704 may use each worker services module 715*b* to hash their respective user account information. In one or more instances, similar to as described above with regard to the client device 702 at step 802, the account filter server 704 may apply an MD5 hash algorithm to the user account information at each respective worker services module 715*b*. In these instances, the account filter server 704 may generate a 128 bit binary vector at each worker services module 715*b* that corresponds to these worker service's modules corresponding user account information. For example, the account filter server 704 may generate a first binary vector corresponding to the email address for employee one, a second binary vector corresponding to the email address for employee two, and a third binary vector corresponding to the email address for employee three.

At step 818, the account filter server 704 may use each worker services module 715*b* to apply a matrix composition algorithm to their respective 128 bit binary vectors. Actions performed by the account filter server 704 at step 818 may be similar to those described above with regard to the client device 702 at step 803. For example, the account filter server 704 may generate a matrix at each worker services module 715*b* corresponding to their respective 128 bit binary vectors. For example, the account filter server 704 may generate a first matrix corresponding to the first binary vector, a second matrix corresponding to the second binary vector, and a third matrix corresponding to the third binary vector. After completing step 818, the account filter server 704 may proceed to step 819, which is shown in FIG. 8C.

Referring to FIG. 8C, at step 819, the account filter server 704 may use each worker services module 715*b* to apply an SVD algorithm to their respective matrixes. Actions performed by the account filter server 704 at step 819 may be similar to those described above with regard to the client device 702 at step 803. For example, the account filter server 704 may extract a watermark vector corresponding to each of the respective matrixes. Accordingly, by performing steps 817-820, the account filter server 704 may determine a watermark vector for each possible user account corresponding to an entity associated with the account filter server 704. For example, the account filter server 704 may generate a first watermark vector corresponding to the first matrix, a second watermark vector corresponding to the second matrix, and a third watermark vector corresponding to the third matrix, resulting in watermark vectors corresponding to each possible account (e.g., employees one, two, and three) at the account filter server 704. In these instances, the account filter server 704 may store the extracted watermark vectors at each of the respective worker services modules 715*b*.

At step 820, the account filter server 704 may convert the marked image to the frequency domain. In one or more instances, the account filter server 704 may convert the marked image to the frequency domain at each of the worker services modules 715*b*. In other instances, the account filter server 704 may convert the marked image to the frequency domain prior to routing the marked image to the worker services modules 715*b*. In one or more instances, the account filter server 704 may convert the marked image to the frequency domain by applying a DCT algorithm. Actions performed at step 820 by the account filter server 704 may be similar to those performed by the client device 702 at step 806.

At step 821, the account filter server 704 may user each worker services module 715*b* to analyze the frequency domain images to determine a probability that the marked image was sent by an account corresponding to each respective worker services module 715*b*. In analyzing the frequency domain images, the account filter server 704 may determine a probability that the watermark vector determined by each worker services module 715*b* matches the watermark vector embedded in the frequency domain image. In one or more instances, in analyzing the frequency domain images, the account filter server 704 may compare the watermark vector to a portion of the marked image that contains a watermark vector (e.g., one or more of the blocks generated at step 805). For example, the account filter server 704 may extract, from a predetermined sub-region of the frequency domain image, the embedded watermark vector, and may compare the embedded watermark vector to the watermark vectors corresponding to the watermark vectors at each of the worker services modules 715*b* (e.g., the watermark vectors corresponding to the possible accounts). In other instances, the account filter server 704 might not know the predetermined sub-region, and may analyze the entire frequency domain image to identify the embedded watermark vector. In one or more instances, the frequency domain image may contain the embedded watermark vector in multiple sub-regions, and the account filter server 704 may identify the embedded watermark vector in at least one of these sub-regions.

To continue with the example described above, the account filter server 704 may determine the probabilities that the watermark vectors corresponding to each of employee one, employee two, and employee three match the watermark embedded in the frequency domain image. In this example, the account filter server 704 may determine that there is a 10% chance that the watermark vector corresponding to employee one is a match, a 5% chance that the watermark vector corresponding to employee two is a match, and an 85% chance that the watermark vector corresponding to employee three is a match.

At step 822, the account filter server 704 may use each worker services module 715*b* to transfer the probabilities determined at step 821 to the reduce service module 715*c*. Following the example above, the worker services modules 715*b* may send the 10% chance that the watermark vector corresponding to employee one is a match, the 5% chance that the watermark vector corresponding to employee two is a match, and the 85% chance that the watermark vector corresponding to employee three is a match to the reduce service module 715*c*.

At step 823, the account filter server 704 may use the reduce service module 715*c* to determine which probability, received in step 822, is the largest. For example, if there is an 85% chance that the watermark vector corresponding to employee three is a match, the account filter server 704 may determine that the watermark vector corresponding to employee three is associated with the user account that sent the marked image.

Figure 12:
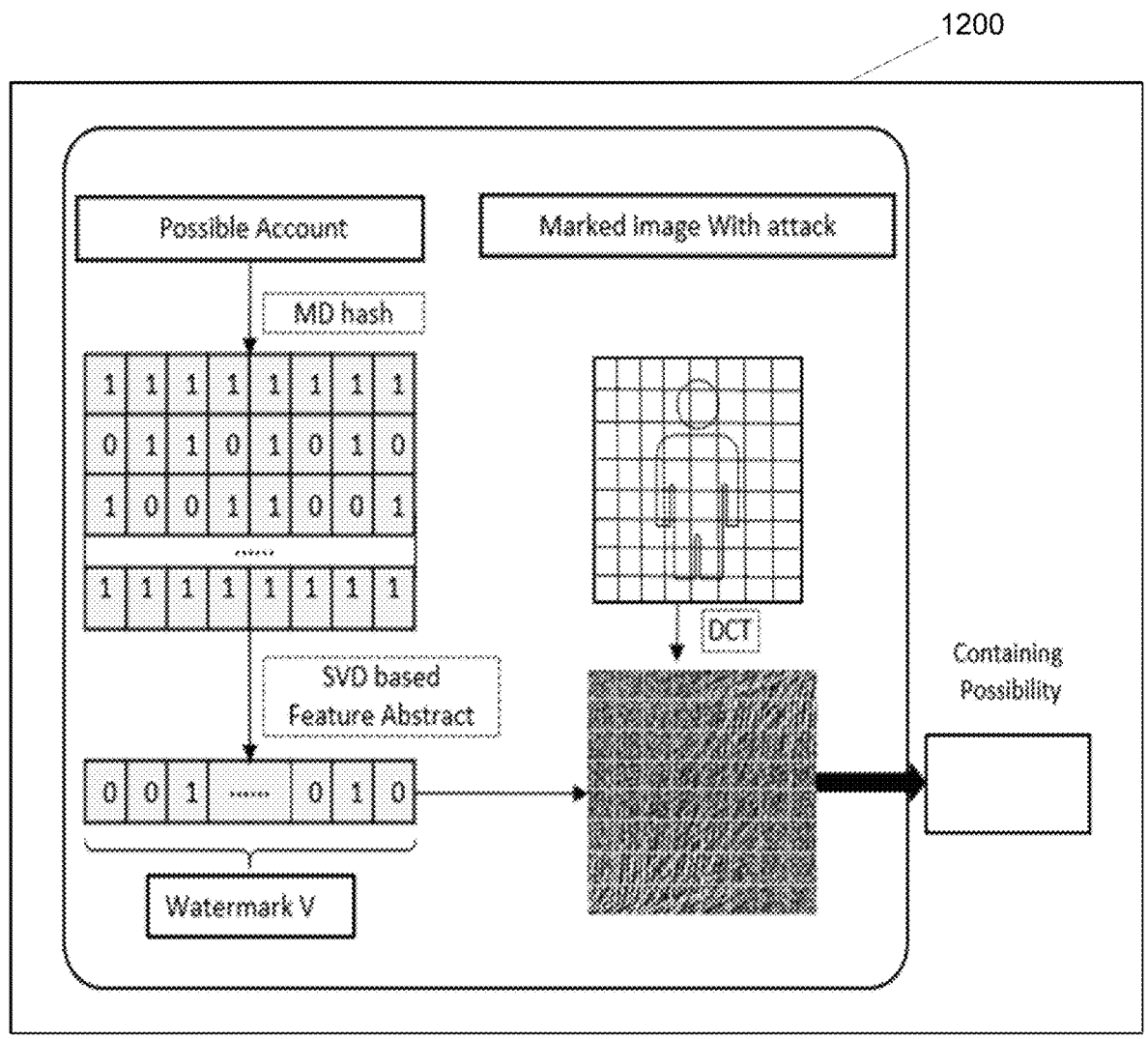

Actions performed at step 815-823 are further illustrated in process flow chart 1200, which is illustrated in FIG. 12. Referring to FIG. 12, the account filter server 704 may apply a hash algorithm to a possible user account corresponding to each of a plurality of worker service modules 715*b* to encrypt the possible accounts. The account filter server 704 may abstract an SVD feature from the encrypted possible accounts, resulting in a watermark vector. The account filter server 704 may transform the marked image (received from the administrator computing platform 703) from the space domain to the frequency domain. The account filter server 704 may then compare a portion of the frequency domain image that contains the embedded watermark to calculate an average similarity. In determining the average similarity, the account filter server 704 may determine the probability that the marked image was sent by the possible account.

At step 824, the account filter server 704 may determine an account corresponding to the watermark vector selected in step 823. In one or more instances, the account filter server 704 may maintain a stored account listing that correlates user account information and the watermark vectors. In these instances, the account filter server 704 may perform a lookup function on the watermark vector to determine the user account. Continuing with the example above, the account filter server may determine that the watermark vector selected at step 823 corresponds to employee three.

At step 825, the account filter server 704 may generate and send an indication of the user account determined at step 824. In one or more instances, the account filter server 704 may send the indication of the user account to the administrator computing platform 703 via the communication interface 716 and while the second wireless data connection is established. In one or more instances, the account filter server 704 may include, in the indication of the user account, a warning of whether or not the identified user should be able to access and/or send the confidential information included in the image. In these instances, various users may be associated with different levels of security at the worker service modules 712b. For example, certain information may be accessible to a company president that might not be accessible to an entry level employee.

At step 826, the account filter server 704 may receive the indication of the user account from the account filter server 704. In these instances, the account filter server 704 may receive the indication of the account via the communication interface 713 and while the second wireless data connection is established.

Subsequently, the event sequence algorithm may end, and the client device 702 and the account filter server 704 may continue to determine senders of images using embedded watermark vectors. In doing so, the client device 702 and the account filter server 704 may trace data leakage in a way that is robust to geometric attacks and that does not affect a user experience at the client device 702.

Figure 9:
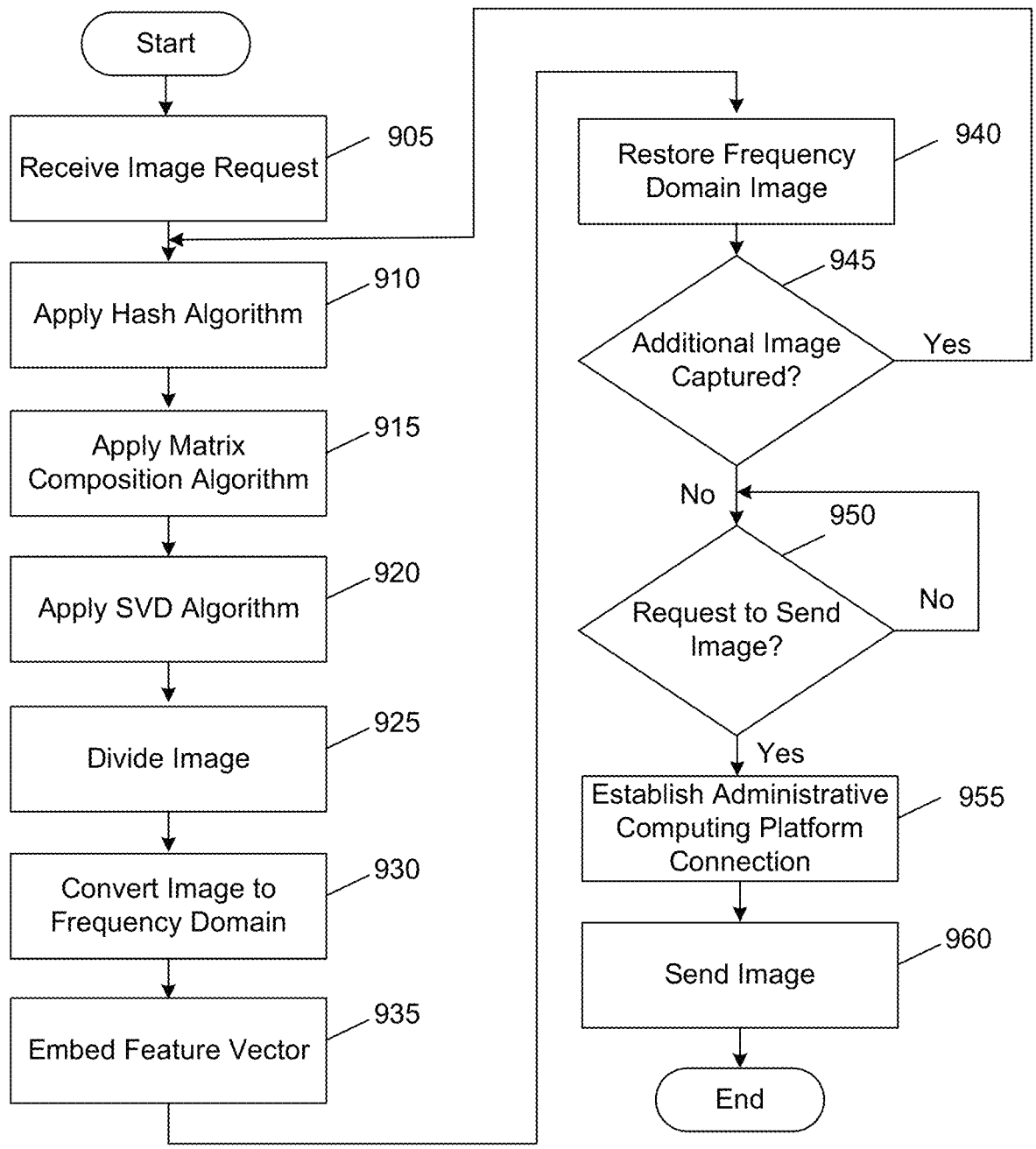
FIGS. 9 and 10 depict illustrative method algorithms for deploying an enhanced processing system that performs tracking of image senders in accordance with one or more example embodiments.

FIG. 9 depicts an illustrative method algorithm for deploying an enhanced processing system that performs tracking and identification of image senders in accordance with one or more example embodiments. Referring to FIG. 9, at step 905, a computing device having at least one processor, a communication interface, and memory may receive a request to capture. At step 910, the computing device may apply a hash algorithm to user account information corresponding to a sender of the image to encrypt the user account information. At step 915, the computing device may apply a matrix composition algorithm to generate a matrix corresponding to the user account information. At step 920, the computing device may apply an SVD algorithm to the matrix to generate a watermark vector. At step 925, the computing device may divide the image into a plurality of blocks. At step 930, the computing device may convert the image to the frequency domain. At step 935, the computing device may embed the watermark vector into the frequency domain image. At step 940, the computing device may restore the frequency domain image to the spatial domain, resulting in a marked image. At step 945, the computing device may determine whether additional images were captured. If additional images were captured, the computing device may return to step 910. If additional images were not captured, the computing device may proceed to step 950.

At step 950, the computing device may determine whether a request to send the image was received. If a request to send the image was not received, the computing device may wait for a request to send the image. If a request to send the image was received, the computing device may proceed to step 955.

At step 955, the computing device may establish a connection with the administrative computing platform. At step 960, the computing device may send the image to the administrative computing platform.

Figure 10:
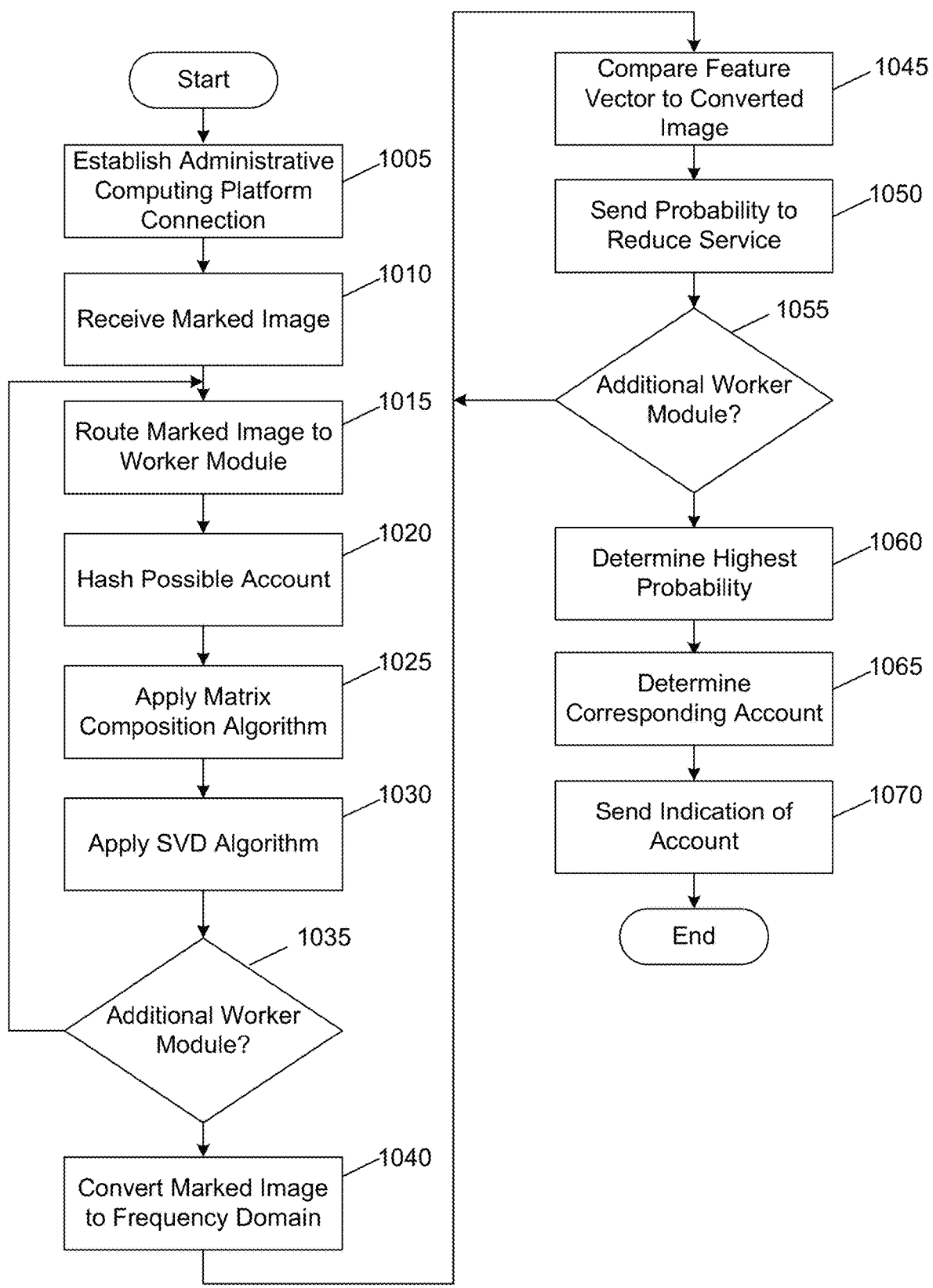

FIG. 10 depicts an illustrative method algorithm for deploying an enhanced processing system that performs tracking and identification of image senders in accordance with one or more example embodiments. While FIG. 9 depicts this illustrative method algorithm from the client device perspective, FIG. 10 depicts the illustrative method algorithm from the server side perspective. Referring to FIG. 10, at step 1005, a computing device having at least one processor, a communication interface, and memory may establish a connection with an administrative computing platform. At step 1010, the computing device may receive a marked image (e.g., the marked image sent at step 960). At step 1015, the computing device may route the marked image to a worker service module associated with a particular user. At step 1020, the computing device may hash a possible account corresponding to the worker service module. At step 1025, the computing device may apply a matrix composition algorithm the hashed possible account to generate a corresponding matrix. At step 1030, the computing device may apply an SVD algorithm to the matrix to generate a watermark vector corresponding to the possible account. At step 1035, the computing device may determine whether an additional worker service module is stored. If an additional worker service module is stored, the computing device may return to step 1015. If an additional worker service module is not stored, the computing device may proceed to step 1040.

At step 1040, the computing device may convert the marked image to the frequency domain. At step 1045, the computing device may compare the watermark vector determined at step 1030 to the frequency domain image to determine a similarity between the watermark vector and an embedded watermark vector in the frequency domain image. At step 1050, the computing device may send a probability that the watermark vector matches the embedded watermark vector. At step 1055, the computing device may determine whether an additional worker service module is stored. If an additional worker service module is stored, the computing device may return to step 1045. If an additional worker service module is not stored, the computing device may proceed to step 1060.

At step 1060, the computing device may determine which of the worker service modules determined a highest probability of a match between the watermark vector and the embedded watermark vector. At step 1065, the computing device may determine a user account corresponding to the determined worker service module. At step 1070, the computing device may send an indication of the account to the administrator computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing systems discussed above may be combined into a single computing system, and the various functions of each computing system may be performed by the single computing system. In such arrangements, any and/or all of the above-discussed communications between computing systems may correspond to data being accessed, moved, modified, updated, and/or otherwise used by the single computing system. Additionally or alternatively, one or more of the computing systems discussed above may be implemented in one or more virtual machines that are provided by one or more physical computing systems. In such arrangements, the various functions of each computing system may be performed by the one or more virtual machines, and any and/or all of the above-discussed communications between computing systems may correspond to data being accessed, moved, modified, updated, and/or otherwise used by the one or more virtual machines.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   at least one processor; and
   a memory storing computer readable instructions that, when executed by the at least one processor, cause the system to:
   receive an image containing a first watermark vector corresponding to a user account of a sender of the image;
   route the image to memory of the system in which modules correspond to unique user accounts, and one of the unique user accounts being the user account indicated by the first watermark vector;
   convert the image to a frequency domain image that contains the first watermark vector;
   identify, from the frequency domain image, the first watermark vector;
   compare the first watermark vector to stored watermark vectors that correspond to one of the unique user accounts to determine a probability of a match between at least one of the plurality of stored watermark vectors and the first watermark vector;
   determine the user account of the sender of the image based on the match with the highest probability; and
   send, to a workplace administrator platform, an indication of the user account of the sender of the image.

2. The system of claim 1, wherein:
   receiving the image comprises receiving the image at a dispatch service module of the system, wherein routing the image comprises routing the image by the dispatch service module.

3. The system of claim 2, wherein the computer readable instructions, when executed by the at least one processor, further cause the system to:
   apply, at each of the modules and to each of the respective unique user accounts, a hash function to convert each of the unique user accounts to a binary string;
   apply, at each of the modules and to each binary string, a matrix composition algorithm to generate a binary matrix for each of the unique user accounts;
   extract, at each of the modules and from each binary matrix, a watermark vector; and
   store, at each of the modules, the extracted watermark vectors, resulting in the plurality of stored watermark vectors.

4. The system of claim 3, wherein extracting the watermark vectors comprises applying, at each of the modules and to each binary matrix, an SVD algorithm to determine the extracted watermark vectors.

5. The system of claim 1, wherein receiving the image containing the first watermark vector comprises receiving an indication of the user account of the sender of the image, and wherein determining the user account of the sender of the image comprises tracking a source of a data leak associated with the image containing the first watermark vector.

6. The system of claim 1, wherein the computer readable instructions, when executed by the at least one processor, further cause the system to:
   receive from the workplace administrator platform, an enterprise user list input corresponding to a list of the unique user accounts; and
   generating, for each of the unique user accounts, a corresponding module.

7. The system of claim 1, wherein identifying the first watermark vector comprises extracting, from a predetermined sub-region of the frequency domain image, the first watermark vector.

8. The system of claim 1, wherein the image contains the first watermark vector in more than one location and wherein identifying the first watermark vector comprises identifying the first watermark vector in at least one of the locations.

9. A method comprising:
receiving an image containing a first watermark vector corresponding to a user account of a sender of the image;
routing the image to memory in which modules correspond to unique user accounts and one of the unique user accounts being the user account indicated by the first watermark vector;
converting the image to a frequency domain image that contains the first watermark vector;
identifying, from the frequency domain image, the first watermark vector;
comparing the first watermark vector to stored watermark vectors that correspond to one of the unique user accounts to determine a probability of a match between at least one of the plurality of stored watermark vectors and the first watermark vector;
determining the user account of the sender of the image based on the match with the highest probability; and
sending, to a workplace administrator platform, an indication of the user account of the sender of the image.

10. The method of claim 9, wherein:
receiving the image comprises receiving the image at a dispatch service module, wherein routing the image comprises routing the image by the dispatch service module.

11. The method of claim 10, further comprising:
applying, at each of the modules and to each of the respective unique user accounts, a hash function to convert each of the unique user accounts to a binary string;
applying, at each of the modules and to each binary string, a matrix composition algorithm to generate a binary matrix for each of the unique user accounts;
extracting, at each of the modules and from each binary matrix, a watermark vector; and storing, at each of the modules, the extracted watermark vectors, resulting in the plurality of stored watermark vectors.

12. The method of claim 11, wherein extracting the watermark vectors comprises applying, at each of the modules and to each binary matrix, an SVD algorithm to determine the extracted watermark vectors.

13. The method of claim 9, wherein receiving the image containing the first watermark vector comprises receiving an indication of the user account of the sender of the image, and wherein determining the user account of the sender of the image comprises tracking a source of a data leak associated with the image containing the first watermark vector.

14. The method of claim 9, further comprising:
receiving, from the workplace administrator platform, an enterprise user list input corresponding to a list of the unique user accounts; and
generating, for each of the unique user accounts, a corresponding module.

15. The method of claim 9, wherein identifying the first watermark vector comprises extracting, from a predetermined sub-region of the frequency domain image, the first watermark vector.

16. One or more non-transitory computer-readable media storing instructions that, when executed by a system comprising at least one processor, a communication interface, and memory, cause the system to:
receive an image containing a first watermark vector corresponding to a user account of a sender of the image;
route the image to memory of the system in which modules correspond to unique user accounts, and one of the unique user accounts being the user account indicated by the first watermark vector;
convert the image to a frequency domain image that contains the first watermark vector;
identify, from the frequency domain image, the first watermark vector;
compare the first watermark vector to stored watermark vectors that correspond to one of the unique user accounts to determine a probability of a match between at least one of the plurality of stored watermark vectors and the first watermark vector;
determine the user account of the sender of the image based on the match with the highest probability of a match with the first watermark vector; and
send, to a workplace administrator platform, an indication of the user account of the sender of the image.

17. The one or more non-transitory computer-readable media of claim 16, wherein:
receiving the image comprises receiving the image at a dispatch service module of the system, wherein routing the image comprises routing the image by the dispatch service module.

18. The one or more non-transitory computer-readable media of claim 17, wherein the instructions, when executed by the at least one processor, further cause the system to:
apply, at each of the modules and to each of the respective unique user accounts, a hash function to convert each of the unique user accounts to a binary string;
apply, at each of the modules and to each binary string, a matrix composition algorithm to generate a binary matrix for each of the unique user accounts;
extract, at each of the modules and from each binary matrix, a watermark vector; and
store, at each of the modules, the extracted watermark vectors, resulting in the plurality of stored watermark vectors.

19. The one or more non-transitory computer-readable media of claim 18, wherein extracting the watermark vectors comprises applying, at each of the modules and to each binary matrix, an SVD algorithm to determine the extracted watermark vectors.

20. The one or more non-transitory computer-readable media of claim 16, wherein receiving the image containing the first watermark vector comprises receiving an indication of the user account of the sender of the image, and wherein determining the user account of the sender of the image comprises tracking a source of a data leak associated with the image containing the first watermark vector.

* * * * *